US010767689B2

(12) United States Patent
Seki

(10) Patent No.: US 10,767,689 B2
(45) Date of Patent: Sep. 8, 2020

(54) BEARING DEVICE FOR VEHICLE WHEEL

(71) Applicant: NTN CORPORATION, Osaka-shi, Osaka (JP)

(72) Inventor: Makoto Seki, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/494,018

(22) PCT Filed: Mar. 14, 2018

(86) PCT No.: PCT/JP2018/010071
§ 371 (c)(1),
(2) Date: Sep. 13, 2019

(87) PCT Pub. No.: WO2018/168964
PCT Pub. Date: Sep. 20, 2018

(65) Prior Publication Data
US 2020/0025243 A1 Jan. 23, 2020

(30) Foreign Application Priority Data

Mar. 16, 2017 (JP) ................. 2017-051935

(51) Int. Cl.
*F16C 19/38* (2006.01)
*F16C 33/58* (2006.01)
*B60B 27/00* (2006.01)

(52) U.S. Cl.
CPC .......... *F16C 19/385* (2013.01); *B60B 27/001* (2013.01); *F16C 33/58* (2013.01); *F16C 2326/02* (2013.01)

(58) Field of Classification Search
CPC .. F16C 2326/02; F16C 19/385; F16C 19/386; F16C 19/388; F16C 33/58; F16C 33/585; B60B 27/001; B60B 27/0094
See application file for complete search history.

(56) References Cited

U.S. PATENT DOCUMENTS

| 6,280,093 | B1 * | 8/2001 | Ohtsuki | ................... B60B 27/00 |
| | | | | 384/448 |
| 8,425,124 | B2 * | 4/2013 | Takimoto | .............. F16C 33/585 |
| | | | | 384/589 |
| 2009/0189437 | A1 * | 7/2009 | Takimoto | .............. F16C 33/585 |
| | | | | 301/110.5 |

FOREIGN PATENT DOCUMENTS

| JP | 2004-176747 | 6/2004 |
| JP | 2006-312961 | 11/2006 |

(Continued)

OTHER PUBLICATIONS

International Search Report dated May 22, 2018 in International (PCT) Application No. PCT/JP2018/010071.

*Primary Examiner* — Alan B Waits
(74) *Attorney, Agent, or Firm* — Wenderoth, Lind & Ponack, L.L.P.

(57) ABSTRACT

This bearing device (1) for vehicle wheels comprises: an inner undercut part (8) provided in a portion at which an inner rolling surface (3*d*) formed on the inner side of an inner member (3) and an inner flange surface (3*m*) of the inner rolling surface (3*d*) intersect; an outer undercut part (9) provided in a portion at which an inner rolling surface (3*c*) formed on the outer side of the inner member (3) and an outer flange surface (3*n*) of the inner rolling surface (3*c*) intersect; and a vehicle wheel installation flange (3*e*) provided at a portion adjacent to the inner rolling surface (3*c*) formed on the outer side of the inner member (3), wherein, when the radius of curvature of the inner undercut part (8) is Ri, and the radius of curvature of the outer undercut part (9) is Ro, the relationship of Ri<Ro is satisfied.

4 Claims, 9 Drawing Sheets

(56) References Cited

FOREIGN PATENT DOCUMENTS

| JP | 2012-020676 | 2/2012 |
| JP | 2013-007441 | 1/2013 |

\* cited by examiner

BEARING DEVICE FOR VEHICLE WHEEL

TECHNICAL FIELD

The present invention relates to a bearing device for vehicle wheel.

BACKGROUND ART

A bearing device for vehicle wheel that supports a vehicle wheel rotatable is conventionally known (see, for example, Patent Literature 1). In such a bearing device for vehicle wheel, an outer member is fixed to a vehicle body. Further, an inner member is disposed inside the outer member, and a plurality of rolling elements are interposed between their respective rolling surfaces of the outer member and the inner member. As described above, the bearing device for vehicle wheel constitutes a rolling bearing structure that makes the vehicle wheel attached to the inner member rotatable.

Meanwhile, in such a bearing device for vehicle wheel, so-called undercut work is applied to a portion where an inner rolling surface formed on an inner side of the inner member and an inner-side flange surface of the inner rolling surface intersect (hereinafter, referred to as "inner-side undercut part" (see FIG. 9)). Further, so-called undercut work is applied to a portion where an inner rolling surface formed on an outer side of the inner member and an outer-side flange surface of the inner rolling surface intersect (hereinafter, referred to as "outer-side undercut part" (see FIG. 9)). The inner-side undercut part and the outer-side undercut part are recesses formed to allow a cutting edge of a cutting tool to move through.

Furthermore, in such a bearing device for vehicle wheel, a vehicle wheel installation flange is provided adjacent to the inner rolling surface formed on the outer side of the inner member. Therefore, when a large and impulsive external force is applied to the vehicle wheel installation flange due to that, for example, the vehicle wheel runs on a curb, stress may concentrate on the outer-side undercut part near a base end portion of the vehicle wheel installation flange (see a mark X shown in FIG. 9). Thus, there has been proposed a bearing device for vehicle wheel that secures the function of the outer-side flange surface by fitting another member without forming the outer-side flange surface on the outer side of the inner member (see, for example, Patent Literature 2). Such a bearing device for vehicle wheel, however, has a problem in that cutting work takes a longer time, a large number of parts are required, and a structure becomes complicated. From such circumstances, there has been a demand for a bearing device for vehicle wheel that can reduce a value of stress produced in the outer-side undercut part even with a simple structure. Accordingly, there has been a demand for a bearing device for vehicle wheel that can secure high rigidity even with a simple structure.

CITATIONS LIST

Patent Literature

Patent Literature 1: JP-A 2012-20676 Gazette
Patent Literature 2: JP-A 2006-312961 Gazette

SUMMARY OF INVENTION

Technical Problems

Provided is a bearing device for vehicle wheel that can reduce a value of stress produced in an outer-side undercut part even with a simple structure. Accordingly, provided is a bearing device for vehicle wheel that can secure high rigidity even with a simple structure.

Solutions to Problems

A first aspect of the present invention corresponds to a bearing device for vehicle wheel that includes an outer member having double-row outer rolling surfaces formed on an inner periphery, an inner member having double-row inner rolling surfaces formed on an outer periphery, a plurality of rolling elements rollably interposed between each of the outer rolling surfaces of the outer member and a corresponding one of the inner rolling surfaces of the inner member, an inner-side undercut part provided at a portion where the inner rolling surface formed on an inner side of the inner member and an inner-side flange surface of the inner rolling surface intersect, an outer-side undercut part provided at a portion where the inner rolling surface formed on an outer side of the inner member and an outer-side flange surface of the inner rolling surface intersect, and a vehicle wheel installation flange provided adjacent to the inner rolling surface formed on the outer side of the inner member, in which a bearing device for vehicle wheel, a radius of curvature of the inner-side undercut part defined as Ri and a radius of curvature of the outer-side undercut part defined as Ro satisfy a relation of Ri<Ro.

According to a second aspect of the present invention, in the bearing device for vehicle wheel according to the first aspect of the present invention, the radius of curvature of the inner-side undercut part defined as Ri and the radius of curvature of the outer-side undercut part defined as Ro satisfy a relation of $1.2 \times Ri < Ro < 2.5 \times Ri$.

According to a third aspect of the present invention, in the bearing device for vehicle wheel according to the first or second aspect of the present invention, a height dimension of a portion where a large diameter end surface of each of the rolling elements and the inner-side flange surface are in contact with each other defined as Di and a height dimension of a portion where the large diameter end surface of each of the rolling elements and the outer-side flange surface are in contact with each other defined as Do satisfy a relation of Di=Do.

Advantageous Effects of Invention

In the bearing device for vehicle wheel according to the first aspect of the present invention, the radius of curvature of the inner-side undercut part defined as Ri and the radius of curvature of the outer-side undercut part defined as Ro satisfy the relation of Ri<Ro. According to such a bearing device for vehicle wheel, it is possible to prevent stress from concentrating on the outer-side undercut part. Therefore, it is possible to reduce the value of stress produced in the outer-side undercut part even with a simple structure. This in turn makes it possible to secure high rigidity even with a simple structure.

In the bearing device for vehicle wheel according to the second aspect of the present invention, the radius of curvature of the inner-side undercut part defined as Ri and the radius of curvature of the outer-side undercut part defined as Ro satisfy the relation of $1.2 \times Ri < Ro < 2.5 \times Ri$. According to such a bearing device for vehicle wheel, even when an external force is applied to the vehicle wheel installation flange, it is less likely that strain that causes the outer-side undercut part to open or close occurs. Therefore, it is possible to reliably reduce the value of stress produced in the outer-side undercut part.

In the bearing device for vehicle wheel according to the third aspect of the present invention, the height dimension of the portion where the large diameter end surface of each of the rolling elements and the inner-side flange surface are in contact with each other defined as Di and the height dimension of the portion where the large diameter end surface of each of the rolling elements and the outer-side flange surface are in contact with each other defined as Do satisfy the relation of Di=Do. According to such a bearing device for vehicle wheel, even when an external force is applied to the vehicle wheel installation flange, it is less likely that strain that causes the outer-side undercut part to open or close occurs. Therefore, it is possible to further reliably reduce the value of stress produced in the outer-side undercut part.

DESCRIPTION OF EMBODIMENT

Figure 1:
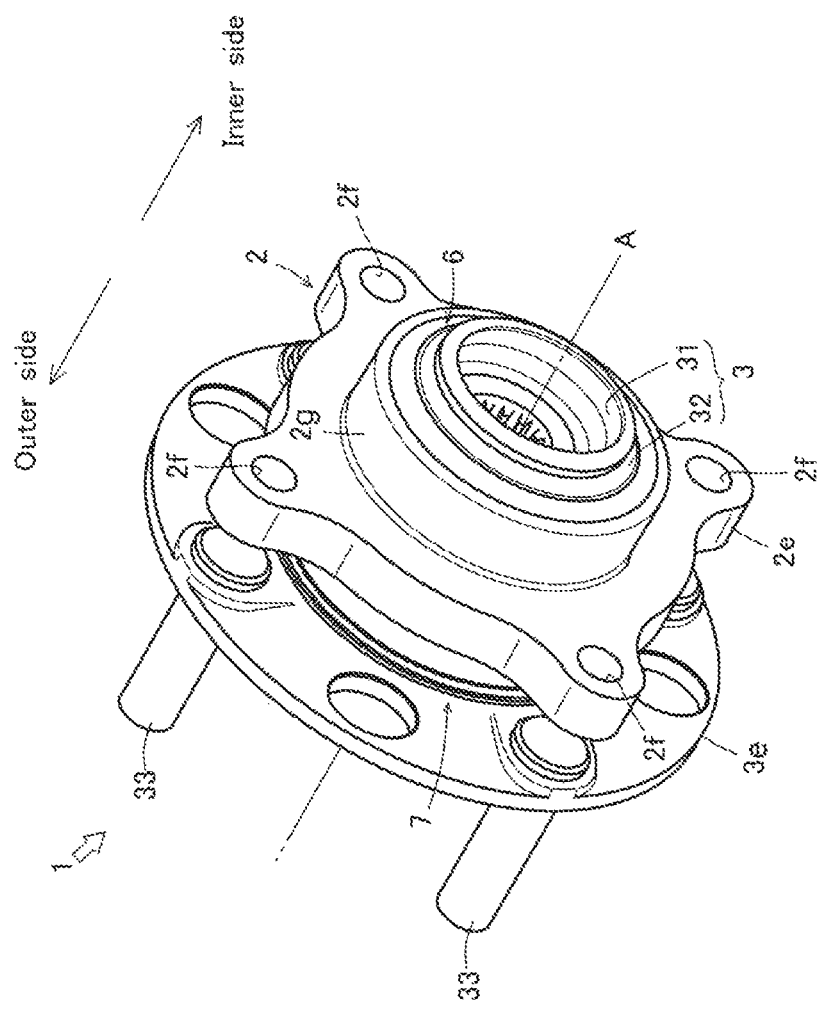
FIG. 1 is a perspective view showing a bearing device for vehicle wheel.
Figure 2:
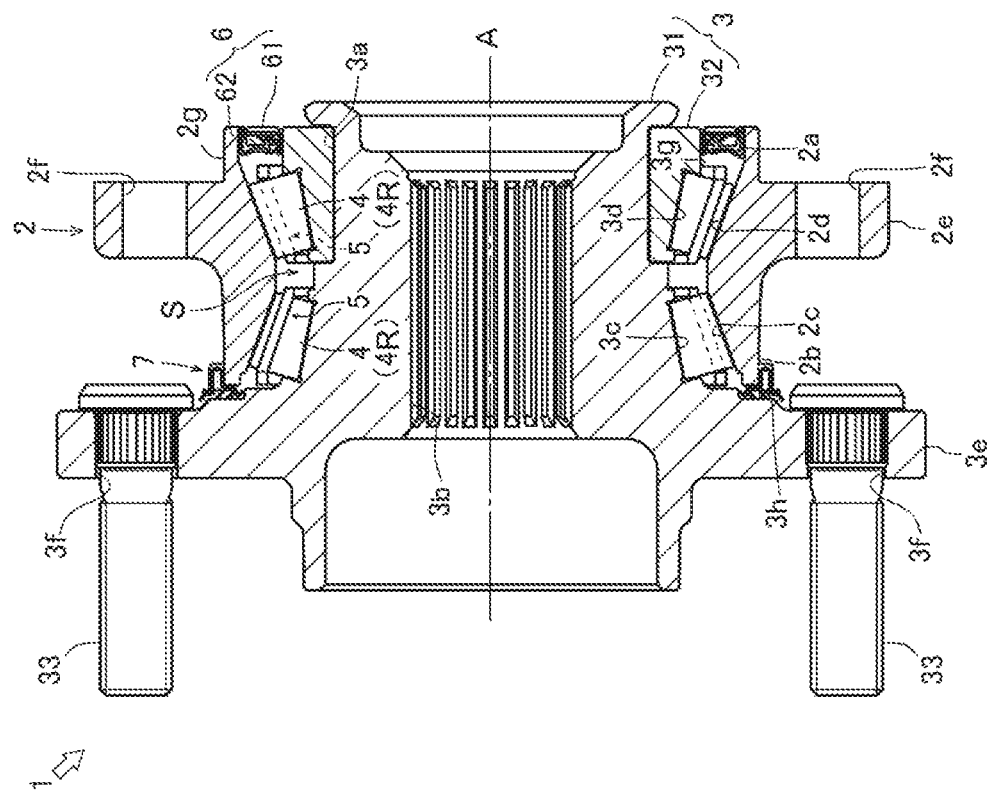
FIG. 2 is a cross-sectional view showing a structure of the bearing device for vehicle wheel.
Figure 3:
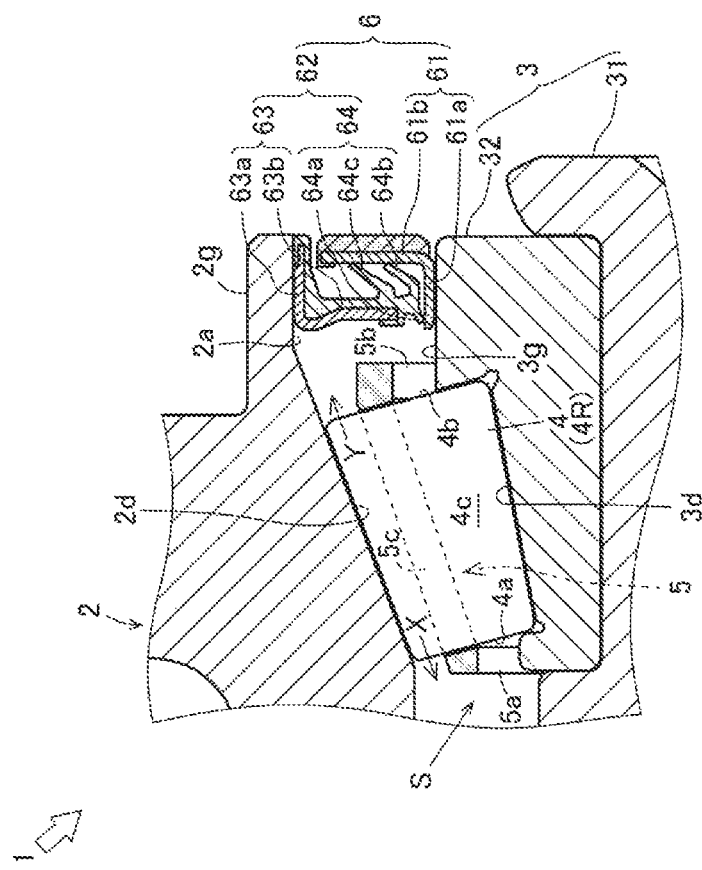
FIG. 3 is a cross-sectional view showing a part of the structure of the bearing device for vehicle wheel.
Figure 4:
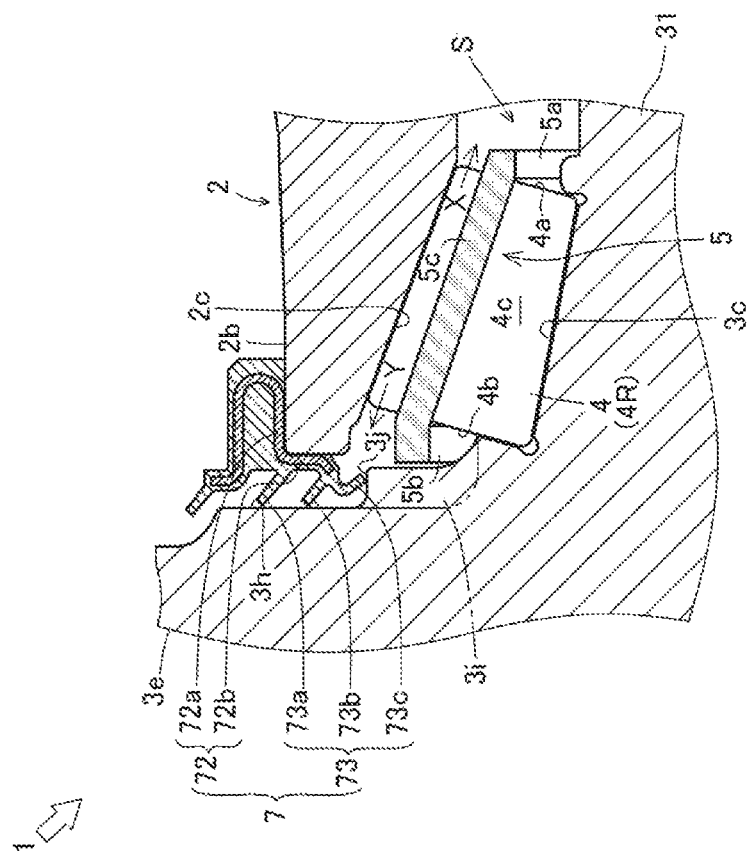
FIG. 4 is a cross-sectional view showing a part of the structure of the bearing device for vehicle wheel.

First, a description will be given of a bearing device for vehicle wheel 1 according to the present invention with reference to FIG. 1 to FIG. 4. FIG. 1 is a perspective view showing the bearing device for vehicle wheel 1. FIG. 2 is a cross-sectional view showing a structure of the bearing device for vehicle wheel 1. FIG. 3 and FIG. 4 are cross-sectional views each showing a part of the structure of the bearing device for vehicle wheel 1.

The bearing device for vehicle wheel 1 supports a vehicle wheel rotatable. The bearing device for vehicle wheel 1 includes an outer member 2, an inner member 3, rolling elements 4, a cage 5, an inner-side seal member 6, and an outer-side seal member 7. Note that, herein, the "inner side" refers to a vehicle-body side of the bearing device for vehicle wheel 1 when installed on the vehicle body, and the "outer side" refers to a vehicle wheel side of the bearing device for vehicle wheel 1 when installed on the vehicle body.

The outer member 2 constitutes an outer ring portion of a rolling bearing structure. The outer member 2 is made of, for example, a medium-high carbon steel such as S53C. A fitting surface 2a is formed on an inner periphery of an inner-side end of the outer member 2. A fitting surface 2b is formed on an outer periphery of an outer-side end of the outer member 2. Further, on an inner periphery of a middle section in an axial direction of the outer member 2, two outer rolling surfaces 2c, 2d are formed. The outer rolling surface 2c faces an inner rolling surface 3c to be described later. The outer rolling surface 2d faces an inner rolling surface 3d to be described later. Note that the outer rolling surfaces 2c, 2d are subjected to, for example, induction hardening and as a result have a surface hardness in a range of from HRC 58 to HRC 64. In addition, a vehicle body installation flange 2e is integrally formed on an outer periphery of the outer member 2. The vehicle body installation flange 2e is provided with a plurality of bolt holes 2f.

The inner member 3 constitutes an inner ring portion of the rolling bearing structure. The inner member 3 is formed of a hub wheel 31 and an inner ring 32.

The hub wheel 31 is made of, for example, a medium-high carbon steel such as S53C. The hub wheel 31 has a small diameter step part 3a formed extending from an inner-side end to a center in the axial direction of the hub wheel 31. The small diameter step part 3a corresponds to a part where an outer diameter of the hub wheel 31 is made smaller, and an outer peripheral surface of the small diameter step part 3a has a cylindrical shape coaxial with a rotation axis A. Further, a universal joint installation hole 3b is formed extending through the hub wheel 31 from the inner-side end to an outer-side end of the hub wheel 31. The universal joint installation hole 3b corresponds to a through hole provided through a center of the hub wheel 31, and an inner peripheral surface of the universal joint installation hole 3b has a concavo-convex shape (spline hole) in which a recess and a protrusion are alternately arranged. However, the universal joint installation hole 3b is not formed under a driven wheel configuration. Furthermore, the inner rolling surface 3c is formed on an outer periphery of the hub wheel 31. The inner rolling surface 3c faces the outer rolling surface 2c described above. Note that a section extending from the small diameter step part 3a to a seal land part (corresponding to a base end portion of a vehicle wheel installation flange 3e to be described later) through the inner rolling surface 3c is subjected to, for example, induction hardening and as a result has a surface hardness in a range of from HRC 58 to HRC 64. In addition, the vehicle wheel installation flange 3e is integrally formed on the outer periphery of the hub wheel 31. The vehicle wheel installation flange 3e is provided with a plurality of bolt holes 3f at equal intervals concentrically around the rotation axis A, and a hub bolt 33 is press-fitted into each of the bolt holes 3f.

The inner ring 32 is made of, for example, a high carbon chromium bearing steel such as SUJ2. A fitting surface 3g is formed on an outer periphery of the inner ring 32. Further, the inner rolling surface 3d is formed on the outer periphery of the inner ring 32. The inner ring 32 is fitted (externally fitted) on the small diameter step part 3a of the hub wheel 31 to form the inner rolling surface 3d on the outer periphery of the hub wheel 31. The inner rolling surface 3d faces the outer rolling surface 2d described above. Note that the inner ring 32 is subjected to so-called through hardening and as a result has a hardness up to its core part in a range of HRC 58 to HRC 64.

The rolling elements (hereinafter, referred to as "tapered rollers") 4 constitute a rolling portion of the rolling bearing structure. The tapered rollers 4 are made of, for example, a high carbon chromium bearing steel such as SUJ2 or carburized steel such as SCr420. Tapered rollers 4 constituting an inner-side tapered roller row 4R are arranged in a circle at equal intervals by the cage 5 to be described later. These tapered rollers 4 are rollably interposed between the outer rolling surface 2d of the outer member 2 and the inner rolling surface 3d of the inner member 3 (inner ring 32). Further, tapered rollers 4 constituting an outer-side tapered roller row 4R are also arranged in a circle at equal intervals by the cage 5 to be described later. These tapered rollers 4 are rollably interposed between the outer rolling surface 2c of the outer member 2 and the inner rolling surface 3c of the inner member 3 (hub wheel 31). Note that the tapered rollers 4 are subjected to so-called through hardening and as a result has a hardness up to its core part in a range of HRC 62 to HRC 67.

The cage 5 restricts deflection of the tapered rollers 4. The cage 5 is made of, for example, engineering plastic such as PA66 or super engineering plastic such as PPS, or one of these containing glass fiber or the like. The cage 5 has a tapered grid body formed of a small diameter annular part 5a, a large diameter annular part 5b, and a plurality of column parts 5c that connect the small diameter annular part 5a and the large diameter annular part 5b. The small diameter annular part 5a extends along a small diameter end surface 4a of each of the tapered rollers 4, which restricts deflection of the tapered rollers 4 to one side in the axial direction (shift in a direction of an arrow X shown in FIG. 3 and FIG. 4). Further, the large diameter annular part 5b extends along a large diameter end surface 4b of each of the tapered rollers 4, which restricts deflection of the tapered rollers 4 to the other side in the axial direction (shift in a direction of an arrow Y shown in FIG. 3 and FIG. 4). The column parts 5c each extend between tapered rollers 4 adjacent to each other and along outer peripheral surfaces 4c of these tapered rollers 4, which restricts deflection of the tapered rollers 4 in a circumferential direction. Note that the cage 5 may be made of a material resulting from adding carbon fibers or the like to phenol resin, epoxy resin, polyamide resin, or the like. Further, the cage 5 may be made of a cold rolled steel sheet, a hot rolled steel sheet, or an austenitic stainless steel sheet.

The inner-side seal member 6 seals an inner-side opening end of an annular space S formed between the outer member 2 and the inner member 3. However, there are various forms for the inner-side seal member 6, and the present invention is not limited to the form used herein. There is another form where a cap is attached instead of the inner-side seal member 6 or nothing is attached.

The inner-side seal member 6 includes a slinger 61. The slinger 61 is fitted (externally fitted) on the fitting surface 3g of the inner ring 32. The slinger 61 is made of, for example, a stainless steel sheet such as SUS430 or SUS304 or a cold rolled steel sheet such as SPCC. The slinger 61 is formed of an annular steel sheet that is bent by press molding such that its cross section in the axial direction has an approximately L shape. Accordingly, the slinger 61 has a cylindrical fitting part 61a and a disk-shaped side plate part 61b extending from an end of the fitting part 61a toward the outer member 2.

The inner-side seal member 6 includes a seal ring 62. The seal ring 62 is fitted (internally fitted) on a fitting surface 2a of the outer member 2. The seal ring 62 is formed of a core metal 63 and a seal rubber 64. The core metal 63 is made of, for example, a stainless steel sheet such as SUS430 or SUS304 or a cold rolled steel sheet such as SPCC. The core metal 63 is formed of an annular steel sheet that is bent by press molding such that its cross section in the axial direction has an approximately L shape. Accordingly, the core metal 63 has a cylindrical fitting part 63a and a disk-shaped side plate part 63b extending from an end of fitting part 63a toward the inner ring 32. Note that the seal rubber 64 that is an elastic body is bonded by vulcanization to the fitting part 63a and the side plate part 63b.

The seal rubber 64 is made of, for example, a synthetic rubber such as an acrylonitrile-butadiene rubber (NBR), a hydrogenated acrylonitrile butadiene rubber (HNBR), an ethylene propylene rubber (EPDM), a polyacrylic rubber (ACM), a fluororubber (FKM), or a silicone rubber. Seal lips 64a, 64b formed on the seal rubber 64 are so-called main lips and have their respective tip edges in contact with the side plate part 61b of the slinger 61. Further, a seal lip 64c is a so-called grease lip and has its tip edge in contact with the fitting part 61a of the slinger 61. Accordingly, the inner-side seal member 6 prevents foreign matter such as muddy water or dust from entering the annular space S and also prevents grease from leaking out of the annular space S.

The outer-side seal member 7 seals an outer-side opening end of the annular space S formed between the outer member 2 and the inner member 3. However, there are various forms for the outer-side seal member 7, and the present invention is not limited to the form used herein.

The outer-side seal member 7 is fitted (externally fitted) on the fitting surface 2b of the outer member 2. The outer-side seal member 7 is formed of a core metal 72 and a seal rubber 73. The core metal 72 is made of, for example, a stainless steel sheet as SUS430 or SUS304 or a cold rolled steel sheet as SPCC. The core metal 72 is formed of an annular steel sheet that is bent by press molding such that its cross section in the axial direction has an approximately L shape. Accordingly, the core metal 72 has a cylindrical fitting part 72a and a disk-shaped side plate part 72b extending from an end of the fitting part 72a toward the hub wheel 31. Note that the seal rubber 73 that is an elastic body is bonded by vulcanization to the fitting part 72a and the side plate part 72b.

The seal rubber 73 is made of, for example, a synthetic rubber such as an acrylonitrile-butadiene rubber (NBR), a hydrogenated acrylonitrile butadiene rubber (HNBR), an ethylene propylene rubber (EPDM), a polyacrylic rubber (ACM), a fluororubber (FKM), or a silicone rubber. Seal lips 73a, 73b formed on the seal rubber 73 are so-called main lips and have their respective tip edges in contact with a seal flat part 3h of the vehicle wheel installation flange 3e. Further, a seal lip 73c is a so-called grease lip and has its tip edge in contact with a seal peripheral surface part 3j of a step part 3i formed on the vehicle wheel installation flange 3e. Accordingly, the outer-side seal member 7 prevents foreign matter such as muddy water or dust from entering the annular space S and also prevents grease from leaking out of the annular space S.

Figure 5:
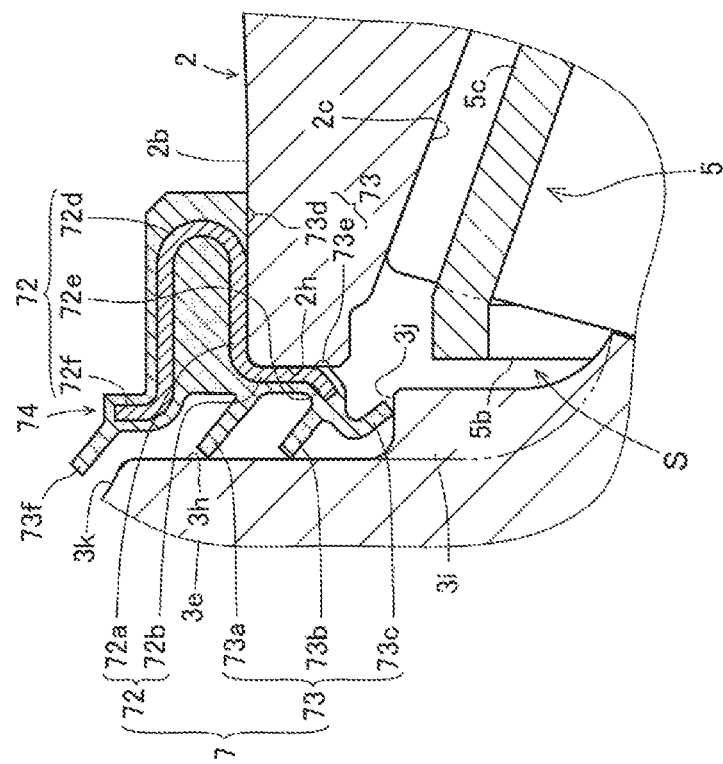
FIG. 5 is a cross-sectional view showing an outer-side seal member.

Next, a description will be given in detail of the outer-side seal member 7 with reference to FIG. 5. FIG. 5 is a cross-sectional view showing the outer-side seal member 7. Hereinafter, "outward" is basically synonymous with "radially outer side" and refers to a direction away from the rotation axis A of the inner member 3. Further, "inward" is basically synonymous with "radially inner side" and refers to a direction approaching the rotation axis A of the inner member 3.

In the outer-side seal member 7, the core metal 72 has the cylindrical fitting part 72a, and the fitting part 72a is fitted (externally fitted) on the fitting surface 2b of the outer member 2. The outer member 2 is designed to make a distance from the outer rolling surface 2c to an outer-side end surface 2h short, thereby causing the fitting part 72a to be fitted on the outside from the cage 5 constituting the outer-side tapered roller row 4R. Note that the reason why the distance from the outer rolling surface 2c to the outer-side end surface 2h can be made short is that it is not necessary to accommodate the outer-side seal member 7 inside the outer member 2, unlike the bearing device for vehicle wheel according to the prior art.

In addition, the core metal 72 has the disk-shaped side plate part 72b, and the side plate part 72b extends along the outer-side end surface 2h of the outer member 2. The outer member 2 is designed to make the distance from the outer rolling surface 2c to the outer-side end surface 2h short, thereby causing the side plate part 72b to extend toward the vicinity of an outer-side end of the cage 5 constituting the outer-side tapered roller row 4R. More specifically, the side plate part 72b extends toward the vicinity of the large diameter annular part 5b of the cage 5. Here, "toward the vicinity of an outer-side end of the cage 5" or "toward the vicinity of the large diameter annular part 5b of the cage 5" refers to a rough direction of the side plate part 72b extending inward. The configuration where the side plate part 72b extends as it is along the outer-side end surface 2h of the outer member 2 toward the vicinity of the large diameter annular part 5b of the cage 5 represents that the outer-side end surface 2h of the outer member 2 and the large diameter annular part 5b of the cage 5 are flush or almost flush with each other. In the bearing device for vehicle wheel 1, the outer-side end surface 2h of the outer member 2 is formed slightly on the outer side from the large diameter annular part 5b of the cage 5.

Furthermore, in the outer-side seal member 7, the seal rubber 73 has the seal lip 73a extending obliquely outward from the inner side to the outer side. The tip edge of the seal lip 73a is in contact with the seal flat part 3h of the vehicle wheel installation flange 3e. Note that the seal lip 73a is a so-called main lip whose a tightening force increases in a direction from the outside toward the annular space S and thus mainly serves to prevent foreign matter such as muddy water or dust from entering the annular space S.

In addition, the seal rubber 73 has the seal lip 73b also extending obliquely outward from the inner-side to the outer side. Then, the tip edge of the seal lip 73b is in contact with the seal flat part 3h in the same manner. Note that the seal lip 73b is also a so-called main lip whose tightening force increases in the direction from the outside toward the annular space S and thus mainly serves to prevent foreign matter such as muddy water or dust from entering the annular space S.

In addition, the seal rubber 73 has the seal lip 73c that is folded back after extending toward the outer side and extends obliquely inward from the outer side to the inner side. The tip edge of the seal lip 73c is in contact with the seal peripheral surface part 3j of the step part 3i. Note that the seal lip 73c is a so-called grease lip whose tightening force increases in a direction from the annular space S toward the outside and thus mainly serves to prevent grease from leaking out of the annular space S.

As described above, the bearing device for vehicle wheel 1 includes the outer-side seal member 7 including the core metal 72 fitted on the outer peripheral surface of the outer member 2 and the seal rubber 73 bonded by vulcanization to the core metal 72. Then, the core metal 72 extends along the outer-side end surface 2h of the outer member 2 toward the vicinity of the outer-side end of the cage 5 (the vicinity of the large diameter annular part 5b), and all the seal lips 73a, 73b, 73c formed on the seal rubber 73 are arranged on the outer side from the outer-side end surface 2h of the outer member 2. The bearing device for vehicle wheel 1 eliminates the need for securing a space for housing the outer-side seal member 7 inside the outer member 2 and has all the seal lips 73a, 73b, 73c aligned in the radial direction, which makes it possible to shorten an axial length of the bearing device for vehicle wheel 1. This in turn reduces bending moment even when the same external force is applied, which makes it possible to increase bearing rigidity and achieve weight reduction.

Further, in the bearing device for vehicle wheel 1, the main lips that are the seal lips 73a, 73b extend obliquely outward from the inner side toward the outer side and have their respective tip edges in contact with the seal flat part 3h of the vehicle wheel installation flange 3e formed on the inner member 3. According to the bearing device for vehicle wheel 1, since all the main lips (73a, 73b) are in contact with the same plane (3h), it is possible to suppress variations in contact pressure of each of the main lips (73a, 73b) due to a product error or assembly error of the inner member 3.

Furthermore, in the bearing device for vehicle wheel 1, the vehicle wheel installation flange 3e has the step part 3i formed protruding to the inner side of the outer-side seal member 7, the grease lip that is the seal lip 73c extends obliquely inward from the outer side toward the inner side, and the tip edge of the grease lip is in contact with the seal peripheral surface part 3j of the step part 3i. According to the bearing device for vehicle wheel 1, the step part 3i narrows the outer-side opening end of the annular space S to restrict the movement of the grease, which makes it possible to prevent oil shortage on the rolling elements 4 and the rolling surfaces (the outer rolling surface 2c and the inner rolling surface 3c). This further makes it possible to reduce the leakage of the grease.

In addition, in the bearing device for vehicle wheel 1, the core metal 72 is folded back into an arc shape from one end of the fitting part 72a, and the seal rubber 73 is bonded by vulcanization to cover a folded portion 72d. Provided at a position where the seal rubber 73 is in contact with the fitting surface 2b is a first interference part 73d protruding inward. This makes it possible to prevent water from entering, from one side, a fitting section between the outer member 2 and the core metal 72. This in turn makes it possible to prevent the fitting section between the outer member 2 and the core metal 72 from being corroded.

In addition, in the bearing device for vehicle wheel 1, the core metal 72 is bent such that a tip portion 72e of the side plate part 72b is separated from the outer-side end surface 2h, and the seal rubber 73 is bonded by vulcanization to cover the tip portion 72e. Provided at a position where the seal rubber 73 is in contact with the outer-side end surface 2h is a second interference part 73e protruding toward the inner side. This makes it possible to prevent water from entering, from the other side, the fitting section between the outer member 2 and the core metal 72. This in turn makes it possible to prevent the fitting section between the outer member 2 and the core metal 72 from being corroded.

In addition, in the bearing device for vehicle wheel 1, the core metal 72 is folded back from the one end of the fitting part 72a to the outer side and bent outward at an end of the core metal 72, and the seal rubber 73 is bonded by vulcanization to cover the folded portion 72d and a bent portion 72f. Accordingly, on the outer-side seal member 7, a weir part 74 is formed protruding outward. The weir part 74 reduces the flow of muddy water flowing along the outer member 2 and muddy water flowing down from the vehicle body to the seal lips 73a, 73b, 73c.

In addition, in the bearing device for vehicle wheel 1, the seal rubber 73 has a labyrinth lip 73f extending obliquely outward from the inner side toward the outer side. The labyrinth lip 73f extends along an oblique surface 3k of the seal flat part 3h with a small gap interposed between the labyrinth lip 73f and the oblique surface 3k. Therefore, the weir part 74 further reduces the flow of muddy water flowing along the outer member 2 and muddy water flowing down from the vehicle body to the seal lips 73a, 73b, 73c.

Figure 6:
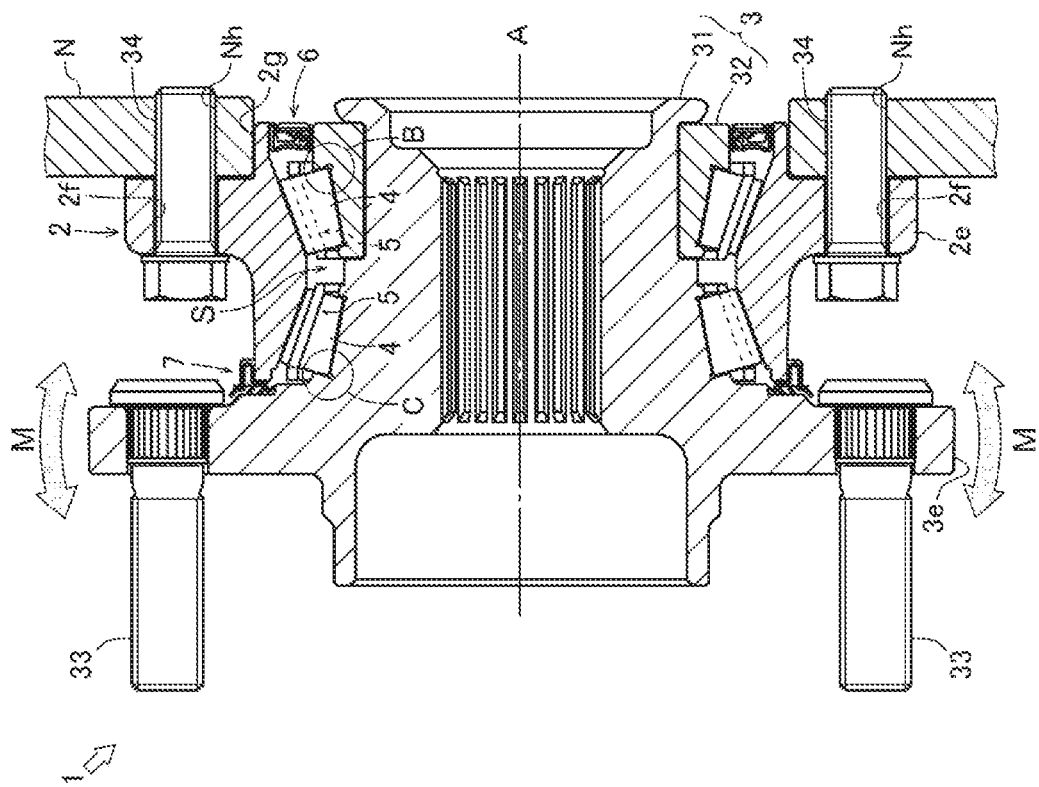
FIG. 6 is a cross-sectional view showing an installation structure of the bearing device for vehicle wheel.

Next, a description will be given of a structure for installing the bearing device for vehicle wheel 1 to the vehicle body with reference to FIG. 6. FIG. 6 is a cross-sectional view showing an installation structure of the bearing device for vehicle wheel 1. Arrows M shown in FIG. 6 indicate the bending moment induced in the vehicle wheel installation flange 3e when a vehicle wheel runs on a curb or the like.

The bearing device for vehicle wheel 1 is installed on the vehicle body using a pilot 2g and the vehicle body installation flange 2e. Specifically, the bearing device for vehicle wheel 1 is installed with knuckle bolts 34, with the pilot 2g having a cylindrical shape fitted on a round circle of a knuckle N and an end surface of the vehicle body installation flange 2e in contact with an end surface of the knuckle N. At this time, the knuckle bolts 34 are inserted from the outer side into the bolt holes 2f of the vehicle body installation flange 2e and threadedly engaged with bolt holes Nh of the knuckle N. Alternatively, the knuckle bolts 34 are inserted from the inner side into the bolt holes Nh of the knuckle N and threadedly engaged with the bolt holes 2f of the vehicle body installation flange 2e.

Figure 7:
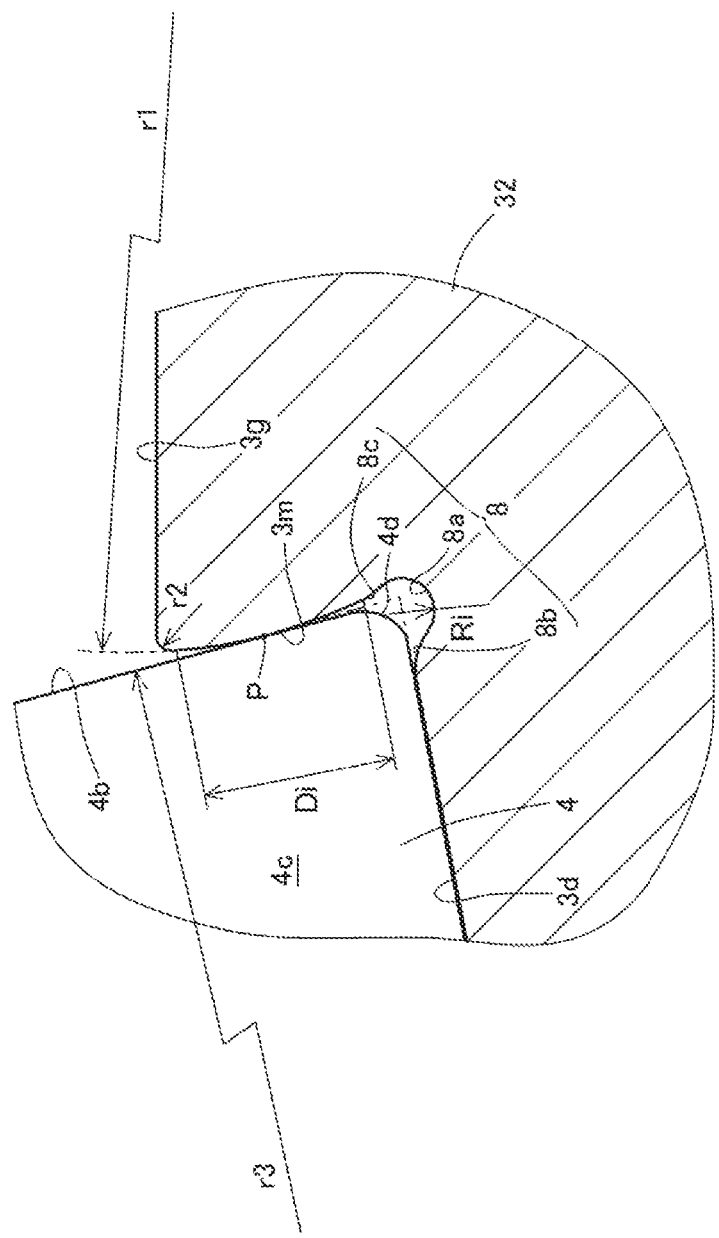
FIG. 7 is a cross-sectional view showing an inner-side undercut part and surroundings of the inner-side undercut part.

Next, a description will be given of an inner-side undercut part 8 with reference to FIG. 7. FIG. 7 is a cross-sectional view showing the inner-side undercut part 8 and surroundings of the inner-side undercut part 8. FIG. 7 corresponds to an enlarged view of a region B shown in FIG. 6.

As shown in FIG. 7, on the inner ring 32, an inner-side flange surface 3m is formed extending approximately perpendicular to the inner rolling surface 3d. The inner-side flange surface 3m has a cross section in the axial direction formed into an arc shape with a radius of curvature r1. Further, an outer end portion of the cross section in the axial direction of the inner-side flange surface 3m is formed into an arc shape having a radius of curvature r2 and is smoothly connected to the fitting surface 3g. On the other hand, the large diameter end surface 4b of each of the tapered rollers 4 are formed into a spherical shape having a radius of curvature r3. Accordingly, the large diameter end surface 4b and the inner-side flange surface 3m are in contact with each other at a point P shown in FIG. 7. More specifically, the large diameter end surface 4b and the inner-side flange surface 3m are in contact with each other on an elliptical surface centered on the point P shown in FIG. 7. However, a size of the elliptical surface varies depending on magnitude of load applied in the axial direction.

Furthermore, as shown in FIG. 7, the inner-side undercut part 8 recessed in an approximately arc shape is formed at an intersection of the inner rolling surface 3d and the inner-side flange surface 3m. The inner-side undercut part 8 has an inner peripheral surface 8a connected to the inner rolling surface 3d with a gently-curved surface 8b interposed between the inner peripheral surface 8a and the inner rolling surface 3d. Further, the inner peripheral surface 8a of the inner-side undercut part 8 is connected to the inner-side flange surface 3m with a gently-curved surface 8c interposed between the inner peripheral surface 8a and the inner-side flange surface 3m. Then, the inner-side undercut part 8 is formed relatively large so as to accommodate chamfered parts 4d of the tapered rollers 4. Note that, in the bearing device for vehicle wheel 1, the inner peripheral surface 8a of the inner-side undercut part 8 has an approximately arc shape. Herein, a radius of curvature of such an approximately arc shape is defined as "radius of curvature Ri". Further, herein, a height dimension of the portion where the large diameter end surface 4b of each of the tapered rollers 4 and the inner-side flange surface 3m are in contact with each other is defined as "height dimension Di". Specifically, a height dimension of a portion of the inner-side flange surface 3m formed into an arc shape with the radius of curvature r1 is defined as the "height dimension Di".

Figure 8:
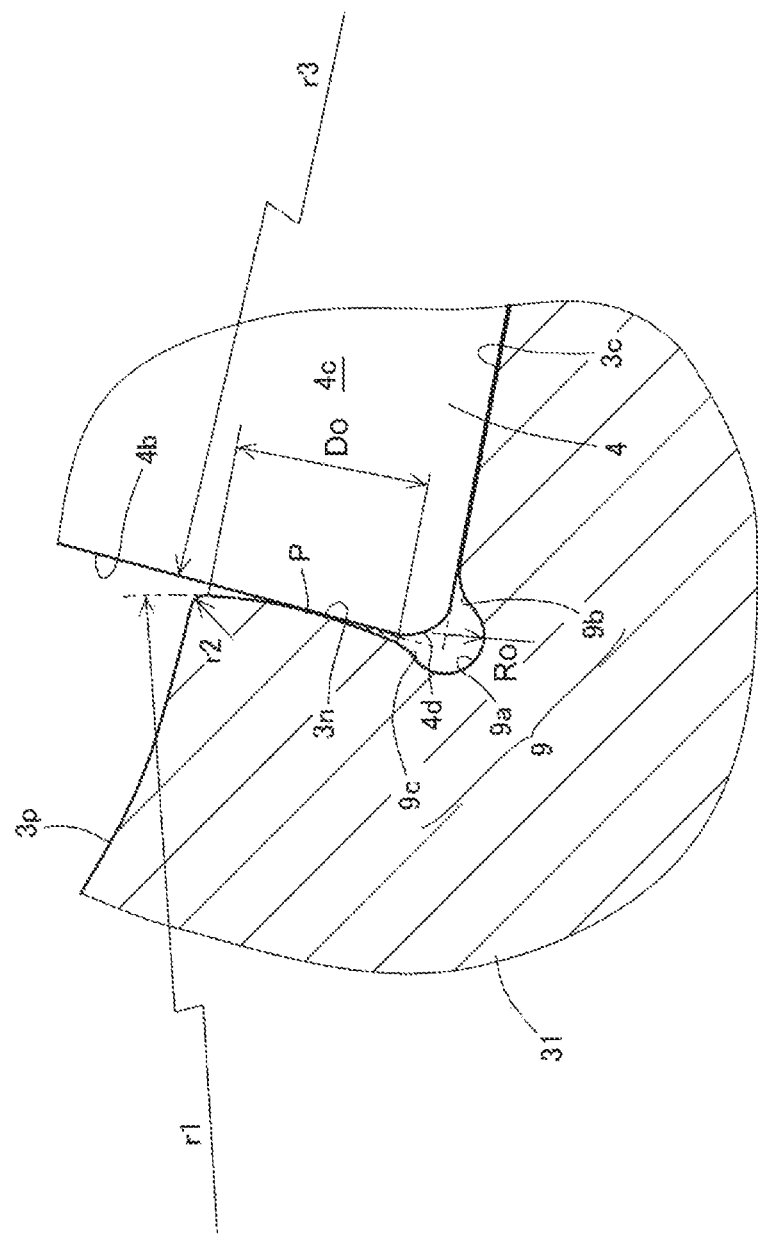
FIG. 8 is a cross-sectional view showing an outer-side undercut part and surroundings of the outer-side undercut part.
Figure 9:
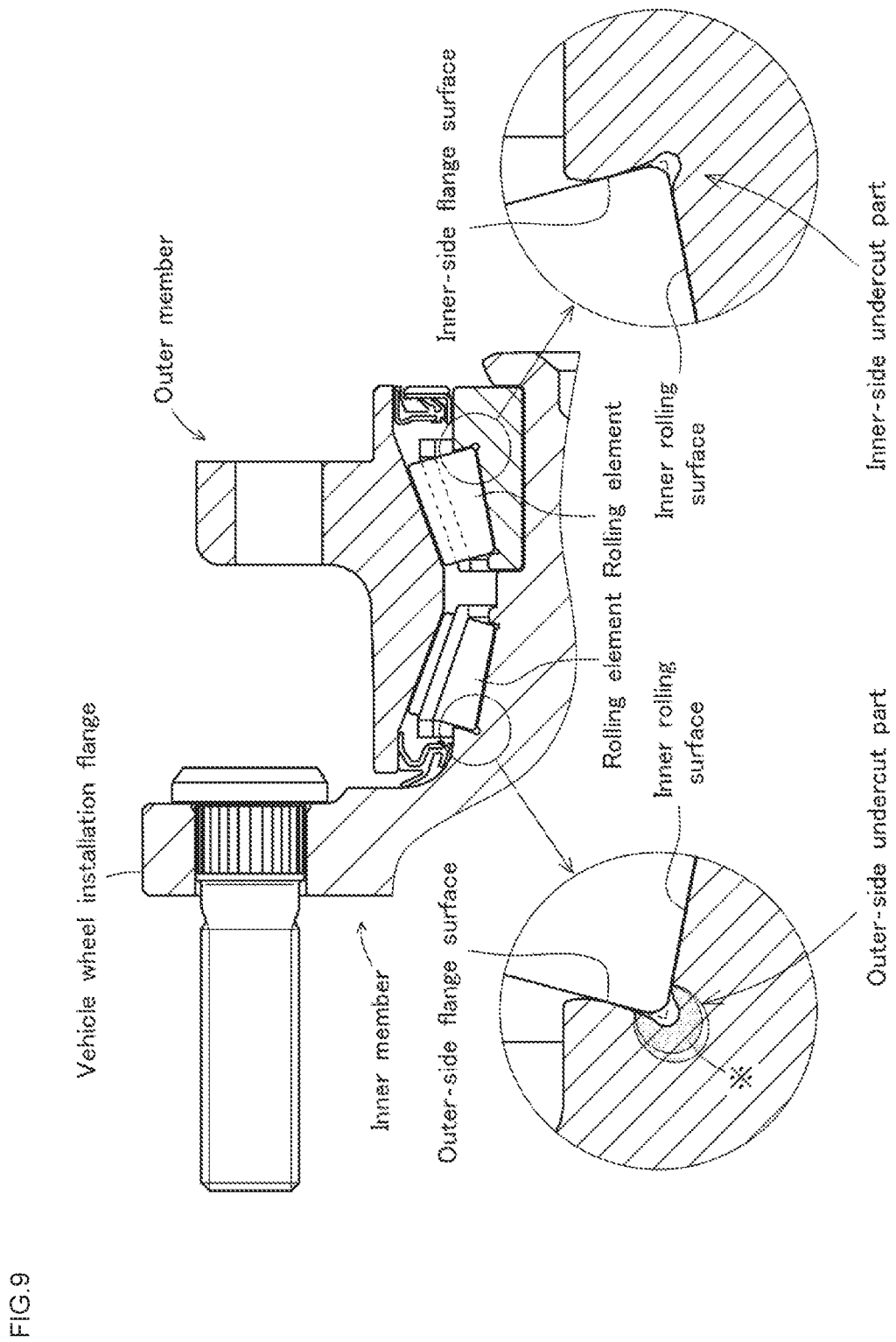
FIG. 9 is a cross-sectional view showing an inner-side undercut part and an outer-side undercut part of a conventional bearing device for vehicle wheel.

Next, a description will be given in detail of the outer-side undercut part 9 with reference to FIG. 8. FIG. 8 is a cross-sectional view showing the outer-side undercut part 9 and surroundings of the outer-side undercut part 9. FIG. 8 corresponds to an enlarged view of a region C shown in FIG. 6.

As shown in FIG. 8, the hub wheel 31 has an outer-side flange surface 3n formed extending approximately perpendicular to the inner rolling surface 3c. The outer-side flange surface 3n has a cross section in the axial direction formed into an arc shape with the radius of curvature r1. Further, an outer end portion of the cross section in the axial direction of the outer-side flange surface 3n is formed into an arc shape having the radius of curvature r2 and is smoothly connected to an oblique surface 3p. On the other hand, the large diameter end surface 4b of each of the tapered rollers 4 are formed into a spherical shape having a radius of curvature r3. Accordingly, the large diameter end surface 4b and the inner-side flange surface 3n are in contact with each other at a point P shown in FIG. 8. More specifically, the large diameter end surface 4b and the inner-side flange surface 3n are in contact with each other on an elliptical surface centered on the point P shown in FIG. 8. However, a size of the elliptical surface varies depending on magnitude of load applied in the axial direction.

Furthermore, as shown in FIG. 8, the outer-side undercut part 9 recessed in an approximately arc shape is formed at an intersection of the inner rolling surface 3c and the inner-side flange surface 3n. The outer-side undercut part 9 has an inner peripheral surface 9a connected to the inner rolling surface 3c with a gently-curved surface 9b interposed between the inner peripheral surface 9a and the inner rolling surface 3c. Further, the inner peripheral surface 9a of the outer-side undercut part 9 is connected to the outer-side flange surface 3n with a gently-curved surface 9c between the inner peripheral surface 9a and the outer-side flange surface 3n. Then, the outer-side undercut part 9 is formed relatively large so as to accommodate the chamfered parts 4d of the tapered rollers 4. Note that, in the bearing device for vehicle wheel 1, the inner peripheral surface 9a of the outer-side undercut part 9 has an approximately arc shape. Herein, a radius of curvature of such an approximately arc shape is defined as "radius of curvature Ro". Further, herein, a height dimension of the portion where the large diameter end surface 4b of each of the tapered rollers 4 and the outer-side flange surface 3n are in contact with each other is defined as "height dimension Do". Specifically, a height dimension of a portion of the outer-side flange surface 3n formed into an arc shape with the radius of curvature r1 is defined as the "height dimension Do".

A description will be given below of a relation between the radius of curvature Ri and the radius of curvature Ro. Further, a description will be given of a relation between the height dimension Di and the height dimension Do.

As described above, the inner peripheral surface 8a of the inner-side undercut part 8 has an approximately arc shape. In the bearing device for vehicle wheel 1, the radius of curvature Ri is 1.0 mm. On the other hand, the inner peripheral surface 9a of the outer-side undercut part 9 also has an approximately arc shape. In the bearing device for vehicle wheel 1, the radius of curvature Ro is 2.0 mm. This is based on a result obtained by numerical analysis using all conditions as parameters, indicating that it is necessary to satisfy Ri<Ro and preferable to satisfy 1.2×Ri<Ro<2.5×Ri. Note that when Ri<Ro is satisfied, it is possible to prevent stress from concentrating on the outer-side undercut part 9. Further, when 1.2×Ri<Ro<2.5×Ri is satisfied, it is less likely that strain that causes the outer-side undercut part 9 to open or close occurs even when an external force is applied to the vehicle wheel installation flange 3e. Note that when 1.2× Ri<Ro<2.5×Ri is satisfied, a remarkable effect of reducing a stress value by 5% to 20% is exhibited.

In addition, by similar numerical analysis, a result indicating that it is more preferable to satisfy Di=Do is also obtained. When Di=Do is satisfied, it is less likely that strain that causes the outer-side undercut part 9 to open or close occurs even when an external force is applied to the vehicle wheel installation flange 3e.

As described above, in the bearing device for vehicle wheel 1, the radius of curvature of the inner-side undercut part 8 defined as Ri and the radius of curvature of the outer-side undercut part 9 defined as Ro satisfy the relation of Ri<Ro. According to the bearing device for vehicle wheel 1, it is possible to prevent stress from concentrating on the outer-side undercut part 9. Therefore, it is possible to reduce a value of stress produced in the outer-side undercut part 9 even with a simple structure. This in turn makes it possible to secure high rigidity even with a simple structure.

Further, in the bearing device for vehicle wheel 1, the radius of curvature of the inner-side undercut part 8 defined as Ri and the radius of curvature of the outer-side undercut part 9 defined as Ro satisfy the relation of 1.2×Ri<Ro<2.5× Ri. According to the bearing device for vehicle wheel 1, it is less likely that strain that causes the outer-side undercut part 9 to open or close occurs even when an external force is applied to the vehicle wheel installation flange 3e. Therefore, it is possible to reliably reduce the value of stress produced in the outer-side undercut part 9.

Furthermore, in the bearing device for vehicle wheel 1, the height dimension of the portion where the large diameter end surface 4b of each of the tapered rollers 4 and the inner-side flange surface 3m are in contact with each other defined as Di and the height dimension of the portion where the large diameter end surface 4b of each of the tapered rollers 4 and the outer-side flange surface 3n are in contact with each other defined as Do satisfies the relation of Di=Do. According to the bearing device for vehicle wheel 1, it is less likely that strain that causes the outer-side undercut part 9 to open or close occurs even when an external force is applied to the vehicle wheel installation flange 3e. Therefore, it is possible to further reliably reduce the value of stress produced in the outer-side undercut part 9.

REFERENCE SIGNS LIST

1 Bearing device for vehicle wheel
2 Outer member
2c Outer rolling surface
2d Outer rolling surface
3 Inner member
3c Inner rolling surface
3d Inner rolling surface
3e Vehicle wheel installation flange
3m Inner-side flange surface
3n Outer-side flange surface
4 Rolling element
4a Small diameter end surface
4b Large diameter end surface
4c Outer peripheral surface
5 Cage
6 Inner-side seal member
7 Outer-side seal member
8 Inner-side undercut part
8a Inner peripheral surface
8b Curved surface
8c Curved surface
9 Outer-side undercut part
9a Inner peripheral surface
9b Curved surface
9c Curved surface
Ri Radius of curvature of inner-side undercut part
Ro Radius of curvature of outer-side undercut part
Di Height dimension of portion where large diameter end surface of rolling element and inner-side flange surface are in contact with each other
Do Height dimension of portion where large diameter end surface of rolling element and outer-side flange surface are in contact with each other

The invention claimed is:

1. A bearing device for vehicle wheel comprising:
an outer member having double-row outer rolling surfaces formed on an inner periphery;
an inner member having double-row inner rolling surfaces formed on an outer periphery;
a plurality of rolling elements rollably interposed between each of the outer rolling surfaces of the outer member and a corresponding one of the inner rolling surfaces of the inner member;
an inner-side undercut part provided at a portion where the inner rolling surface formed on an inner side of the inner member and an inner-side flange surface of the inner rolling surface intersect;
an outer-side undercut part provided at a portion where the inner rolling surface formed on an outer side of the inner member and an outer-side flange surface of the inner rolling surface intersect; and
a vehicle wheel installation flange provided adjacent to the inner rolling surface formed on the outer side of the inner member,
wherein a radius of curvature of the inner-side undercut part defined as Ri and a radius of curvature of the outer-side undercut part defined as Ro satisfy a relation of Ri<Ro.

2. The bearing device for vehicle wheel according to claim 1, wherein the radius of curvature of the inner-side undercut part defined as Ri and the radius of curvature of the outer-side undercut part defined as Ro satisfy a relation of 1.2×Ri<Ro<2.5×Ri.

3. The bearing device for vehicle wheel according to claim 1, wherein a height dimension of a portion where a large diameter end surface of each of the rolling elements and the inner-side flange surface are in contact with each other defined as Di and a height dimension of a portion where the large diameter end surface of each of the rolling elements and the outer-side flange surface are in contact with each other defined as Do satisfy a relation of Di=Do.

4. The bearing device for vehicle wheel according to claim 2, wherein a height dimension of a portion where a large diameter end surface of each of the rolling elements and the inner-side flange surface are in contact with each other defined as Di and a height dimension of a portion where the large diameter end surface of each of the rolling elements and the outer-side flange surface are in contact with each other defined as Do satisfy a relation of Di=Do.

\* \* \* \* \*